(12) United States Patent
Singh et al.

(10) Patent No.: US 7,693,034 B2
(45) Date of Patent: Apr. 6, 2010

(54) COMBINED INVERSE FAST FOURIER TRANSFORM AND GUARD INTERVAL PROCESSING FOR EFFICIENT IMPLEMENTATION OF OFDM BASED SYSTEMS

(75) Inventors: Balvinder Singh, Bangalore (IN); Suyog Moogi, Bangalore (IN)

(73) Assignee: Sasken Communication Technologies Ltd., Bangalore (IN)

( * ) Notice: Subject to any disclaimer, the term of this patent is extended or adjusted under 35 U.S.C. 154(b) by 1865 days.

(21) Appl. No.: 10/649,315

(22) Filed: Aug. 27, 2003

(65) Prior Publication Data

US 2005/0047325 A1 Mar. 3, 2005

(51) Int. Cl.
*H04J 11/00* (2006.01)
(52) U.S. Cl. .................. 370/208; 370/209; 370/210; 708/403; 708/404; 708/405; 708/406; 708/407; 708/408; 708/409; 375/219; 375/222; 375/260
(58) Field of Classification Search ......... 370/208–210; 708/403–409; 375/222, 219, 260
See application file for complete search history.

(56) References Cited

U.S. PATENT DOCUMENTS

| | | | | |
|---|---|---|---|---|
| 7,315,878 | B2 * | 1/2008 | Han | 708/404 |
| 2001/0040869 | A1 | 11/2001 | Moss | |
| 2003/0081763 | A1 | 5/2003 | Tang et al. | |
| 2004/0059766 | A1 * | 3/2004 | Yeh | 708/406 |
| 2004/0081131 | A1 * | 4/2004 | Walton et al. | 370/344 |
| 2004/0151110 | A1 * | 8/2004 | Mazzoni et al. | 370/210 |

OTHER PUBLICATIONS

PCT—Notification Concerning Transmittal of International Preliminary Report on Patentability (Chapter I of the Patent Cooperation Treaty), and Written Opinion of The International Searching Authority—PCT/US04/28026—International Filing Date: Aug. 27, 2004, Applicant-Sasken Communication Technologies Ltd. (5 pgs.) Dated of mailing: Mar. 23, 2006.
PCT—Notification of Transmittal of The International Search Report And The Written Opinion of The International Searching Authority, or The Declaration—PCT/US04/28026—International Filing Date: Aug. 27, 2004, Applicant-Sasken Communication Technologies Ltd. (11 pgs.) and Listing of Relevant Documents: US2001/0040869A1 (Moss); US2003/0081763A1 (Tang et al.).

* cited by examiner

*Primary Examiner*—Aung S Moe
*Assistant Examiner*—Christopher P Grey
(74) *Attorney, Agent, or Firm*—Husch Blackwell Sanders LLP Welsh & Katz

(57) ABSTRACT

A circuit for converting frequency domain information to time domain information includes an Inverse Fast Fourier Transform circuit having a length of N coefficients. The Inverse Fast Fourier Transform circuit is adapted to receive input data of length N coefficients and generate output data of length N coefficients that are circularly shifted by m coefficients. The circuit also includes Cyclical Prefix Insertion circuit adapted to insert a cyclical prefix of length m. The Cyclical Prefix Insertion circuit includes a first switch, connected to the Inverse Fast Fourier Transform circuit, a buffer, having an input connected to the first switch and an output, the buffer having a length m, and a second switch, coupled to the first switch and to the buffer. The first and second switches selectively couple the output of the buffer and the Inverse Fast Fourier Transform circuit to an output of the second switch. The buffer is reduced to length m.

15 Claims, 14 Drawing Sheets

COMBINED INVERSE FAST FOURIER TRANSFORM AND GUARD INTERVAL PROCESSING FOR EFFICIENT IMPLEMENTATION OF OFDM BASED SYSTEMS

FIELD OF INVENTION

The present invention relates generally to Inverse Fast Fourier Transform and Guard Interval processing in Orthogonal Frequency Division Multiplexing based transmission systems. In particular, combined processing allows a more efficient implementation of an OFDM system.

BACKGROUND OF THE INVENTION

Orthogonal Frequency Division Multiplexing ("OFDM") is a multi-carrier data transmission technique that is advantageously used in radio-frequency based transmitter-receiver systems. These systems may include, for example, computer WiFi (IEEE 802.11a) data systems. Other standards where OFDM based system is used are IEEE 802.16 for a Fixed Wireless Access (FWA), HiperLAN2, Digital Audio Broadcast (DAB), Digital Video Broadcast (DVB) and Digital Subscriber Line (DSL).

OFDM systems typically divide available radio spectrum into many carriers. Each of the many carriers has a narrow bandwidth and is modulated with a low rate data stream. The carriers are closely spaced without causing inter-carrier interference (ICI) by ensuring that the carriers are orthogonal to each other.

When generating an OFDM signal, each carrier is assigned a data stream. The data streams are converted into symbols depending on the modulation scheme. For each symbol to be transmitted, phase and amplitude are calculated in the frequency domain. The phase and amplitude are determined according to the modulation scheme, which may be, for example, Quadrature Amplitude Modulation (QAM), Quadrature Phase Shift Key (QPSK), or any other suitable modulation scheme. Once the phase and amplitude are determined, they must be converted to time domain signals for transmission. Typically, OFDM systems use an Inverse Fast Fourier Transform (IFFT) to perform this conversion. The IFFT is an efficient way of mapping the data on to orthogonal carriers. The time domain signal is then up converted to the radio frequency of the appropriate carrier before transmission.

One of the problems associated with radio transmissions is inter-symbol interference (ISI) due to multi-path delay interference. A reflected radio signal follows a longer path than a line of sight radio signal. The difference in delay caused by reflected signals may obscure the direct signal. OFDM systems are well-suited to cope with multi-path delay problems because the low data rate of each carrier generates long symbol periods. Tolerance to multi-path delay is enhanced by the addition of Guard Intervals (GI) separating the symbols. If the Guard Intervals are as long or longer than the differential delays expected from multi-path sources, then multi-path interference is effectively eliminated. To achieve a reasonable throughput, the OFDM symbol duration may be at least five times the Guard Interval. In order to avoid inter-carrier interference (ICI), the OFDM symbol is cyclically extended in the GI.

Guard Interval insertion may be achieved as follows. An IFFT has an associated "length" corresponding to a number of coefficients for the transform. The Guard Interval is generated by outputting the last few IFFT output coefficients at the beginning of the symbol to form a cyclic prefix (CP). The size of the cyclic prefix varies for different applications. For example, for an IFFT with a length of 64, the output corresponding to the last 16 coefficients may be transmitted first as the cyclic prefix, and then the output corresponding to the 64 coefficients of the entire IFFT output in regular order.

For the addition of this CP in known systems, the IFFT output requires relatively large buffers. If the output of the IFFT is in bit-reversed time order, then two buffers of size N (N is length of IFFT) are required. If the output of the IFFT is in time order, then a single buffer of the length of the IFFT (N) is required. Buffers add expense to the system.

What is required is an IFFT and Guard Interval insertion stage that achieves the required signal processing with less buffer requirements.

SUMMARY OF THE INVENTION

A circuit for converting frequency domain information to time domain information includes an Inverse Fast Fourier Transform circuit having a length of N coefficients. The Inverse Fast Fourier Transform circuit is adapted to receive input data of length N coefficients and generate output data of length N coefficients that are circularly shifted by m coefficients. The circuit also includes Cyclical Prefix Insertion circuit adapted to insert a cyclical prefix of length m. The Cyclical Prefix Insertion circuit includes a first switch, connected to the Inverse Fast Fourier Transform circuit, a buffer, having an input connected to the first switch and an output, the buffer having a length m, and a second switch, coupled to the first switch and to the buffer. The first and second switches selectively couple the output of the buffer and the Inverse Fast Fourier Transform circuit to an output of the second switch. The buffer is reduced to length m.

The circular shift may be accomplished by multiplying the input data of the IFFT by a rotation factor, such as $e^{-j(2*Pi*k*m)/N}$, where m is the amount of circular shift, k is the index of the IFFT input data and N is the length of the IFFT. For the particular case where N is a power of two and for a particular choice of a class of IFFT algorithms, this can be efficiently done by only modifying the control and data flow for the IFFT. In an alternative embodiment, applicable only to the particular case just mentioned, circular shift may be achieved by reconfiguring rotator circuit, the addition and subtraction in butterfly circuits and re-arranging the order of the twiddle factors without modifying them. Twiddle factors are complex constant numbers with which the IFFT data in the intermediate stages are multiplied.

In practice, an orthogonal frequency division multiplexed signal is generated by performing a circularly shifted Inverse Fast Fourier Transform on frequency domain information to generate circularly shifted time domain information, wherein the amount of the circular shift is the same as the length of the Guard Interval. A first group of samples of the shifted time domain information is passed to the circuit output and simultaneously stored in a buffer approximately the same size as the desired Guard Interval. When the Guard Interval buffer is full, the remainder of the samples of the Inverse Fast Fourier Transform are output, but not stored in the buffer. When the Inverse Fast Fourier Transform has completed outputting the shifted time domain information for a symbol, the buffer is then output.

While well suited to OFDM systems having guard intervals, the present invention may also be applied to any IFFT or FFT system requiring a circular shift. Also, an IFFT designed according to the present invention may be reused as an FFT without eliminating the rotation. The rotation in the FFT may be removed in a subsequent stage.

DETAILED DESCRIPTION OF THE PREFERRED EMBODIMENT

A. Known Fourier Transform Architectures

There are a number of known schemes for OFDM systems. These schemes employ different IFFT structures.

Figure 1:
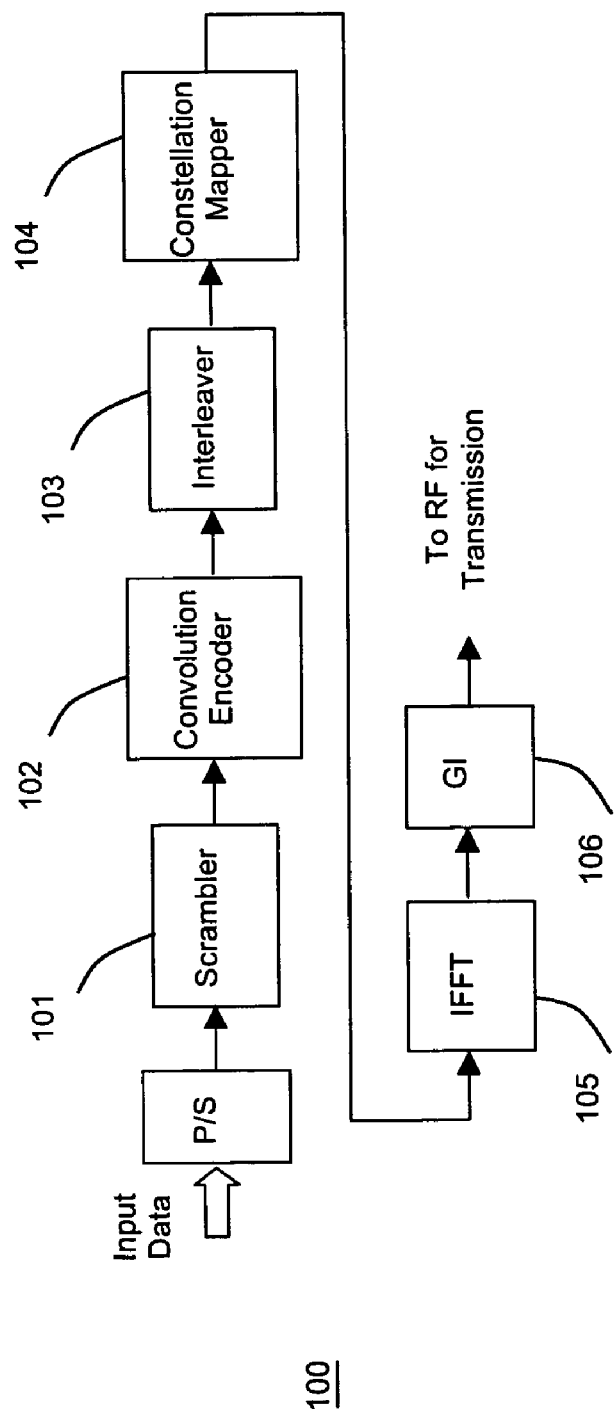
FIG. 1 shows a block diagram of an IEEE 802.11a transmitter.

FIG. 1 shows the block diagram of a known IEEE 802.11 a transmitter 100, which is a typical example of an OFDM system. The input bit stream is processed in a Scrambler 101 by a pseudo random sequence to avoid a continuous stream of ones or zeros. A Convolution Encoder 102 is connected to the scrambler and is a forward error correction module. This is followed by an Interleaver 103, which reduces burst errors. Other OFDM based systems have similar blocks and may have an additional block encoder for forward error correction, like the Reed Solomon encoder in addition to the convolution encoder. The output of Constellation Mapper 104 is connected to the IFFT stage 105. The output of the IFFT stage 105 is connected to Guard Interval Stage 106. The output is then connected to the RF modulation stage (not shown).

Figure 2:
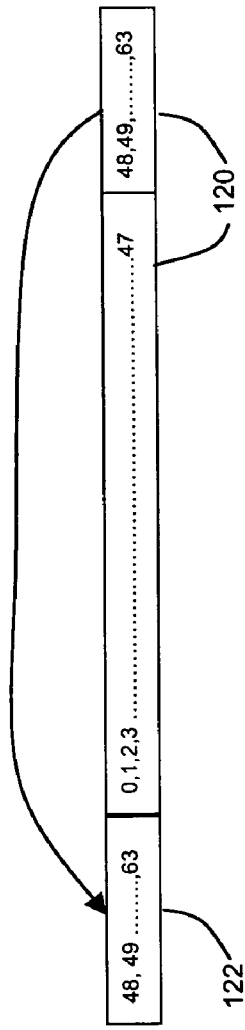
FIG. 2 shows the addition of the cyclic prefix in the Guard Interval between OFDM symbols.

Referring to FIG. 2, the composition of the signal output by the Guard Interval Stage 106 for an IEEE 802.11a system is illustrated. In this example, there is a Symbol 120 and a Guard Interval 122 (comparing a cyclical prefix). The length of IFFT is 64 and the CP or the length of the Guard Interval 122 is 16. The total length of one of the output transform comprises the CP (16) plus the Symbol (64), which requires 80 clock cycles. Other Guard Intervals and symbol lengths may be used in other systems. HIPERLAN 2, for example, has a length of the IFFT and GI, which is the same as IEEE 802.11a but also supports an optional CP of length 8.

Figure 3:
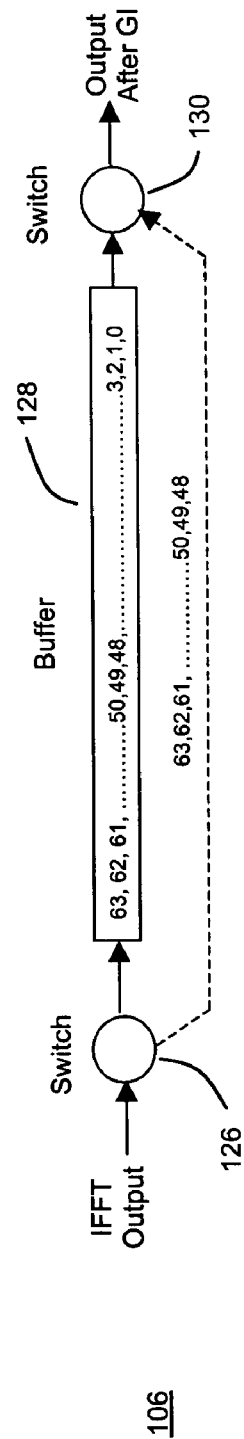
FIG. 3 shows the buffering required for the addition of the Guard Interval, when the output of IFFT is in time order.

Referring to FIG. 3, conventional Guard Interval insertion stage 106 is illustrated. The output of the IFFT stage is connected to Switch 126. Switch 126 selectively routes the output of the IFFT stage to a buffer 128 and to a second Switch 130. If the output of the IFFT is in normal order, a buffer of 64-samples is required. The output of the IFFT is routed into the buffer of length 64. The last 16 samples are routed both to the buffer and the output. Hence, sample numbers 48 to 63 will go out first. After 64 clocks the buffer will be full. The IFFT output will stop for 16 cycles. The sample number 0 to 63 will then be read out of the buffer. After 16 samples the output of the next IFFT will start coming and the process continues. So the output of the IFFT is discontinuous. Only 64 samples are output in the duration of 80 samples. But the output after GI addition is continuous.

Figure 4:
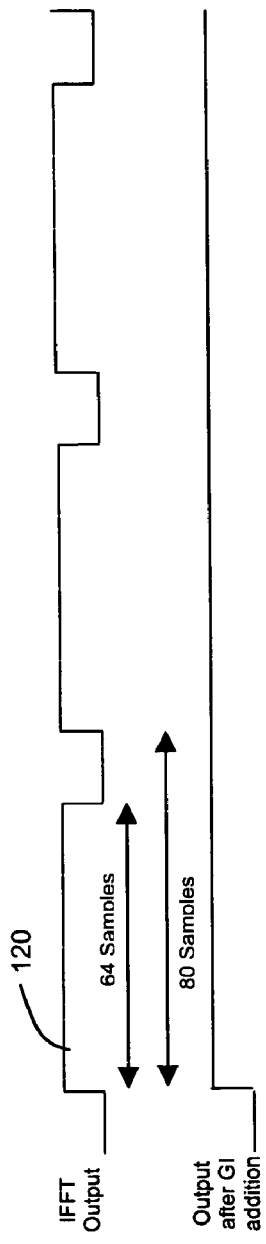
FIG. 4 shows the timing diagram for the IFFT block.

FIG. 4 is an illustration of the timing of a conventional IFFT module. Before Guard Interval insertion, samples are generated only for the Symbol 120. After Guard Interval insertion, samples are continuous, comprising Symbol 120 and Guard Interval 122.

Figure 5:
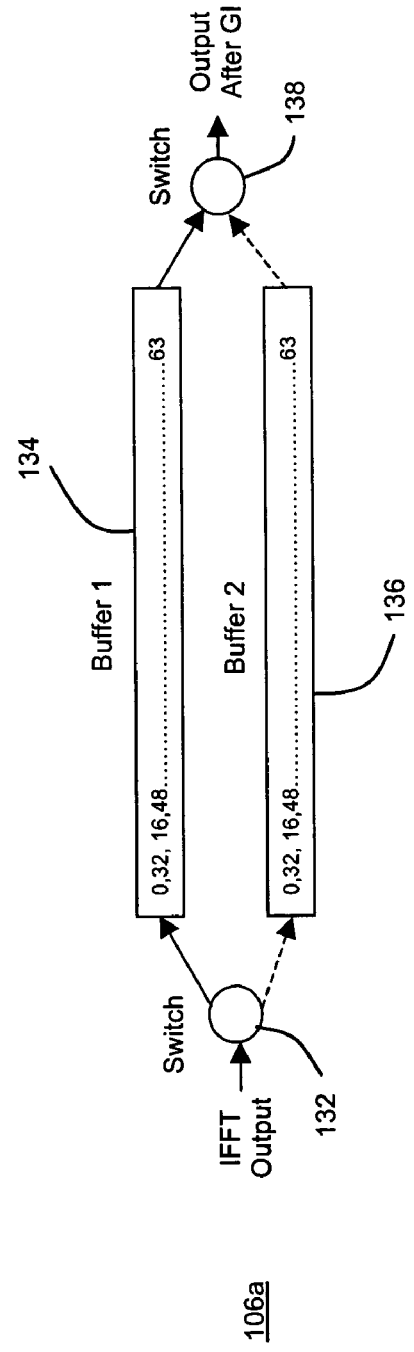
FIG. 5 shows the buffering required for the addition of the Guard Interval, when the output of the IFFT is in bit-reversed order.

An alternative Guard Interval insertion stage 106a is illustrated in FIG. 5. An input of Switch 132 is connected to the IFFT stage. Switch 132 selectively connects the output of the IFFT to Buffers 134 and 136. The outputs of Buffers 134 and 136 are connected to Switch 138. Switch 138 selectively connects the output of the Buffers 134 and 136 to the RF stage (not shown). If the output of the IFFT is in bit reversed order then two buffers of size 64 are required. The IFFT output is written into buffer 134 for 64 clocks. It is then read out of the buffer in the required order. After 64 clocks there is no output of the IFFT for 16 clocks. After 16 clocks the output of the next IFFT is written into buffer 136 while data is read out from the previous buffer 134. This process continues and the IFFT output is written alternately in the two buffers.

Where the transmission signal is converted from frequency domain to time domain by an IFFT, the receiver uses a corresponding Fast Fourier Transform (FFT) to convert received time domain signals back into frequency domain information. The FFT and the IFFT are inverse operations of each other but are very similar in their implementation. Any method for implementing the FFT is generally applicable to the implementation of the IFFT with suitable modifications. Various architectures have been proposed for the implementation of the FFT in hardware. A very good overview of some of the pipeline architectures is given by, Shousheng He and Mats Torkelson, in, A New Approach To Pipeline FFT Processor, International Parallel and Distributed Processing Symposium, 1996.

Figure 6:
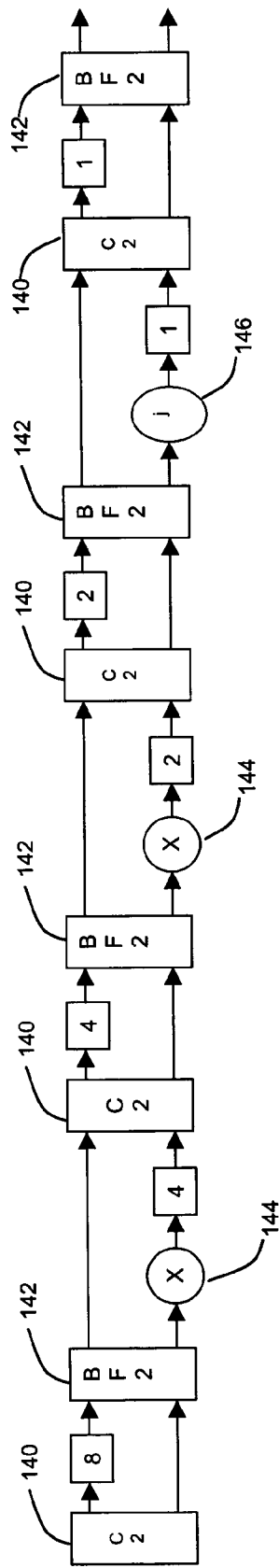
FIG. 6 shows the Radix-2 multipath delay commutator pipeline for the FFT implementation.

One example of a FFT architecture is the Radix-2 Multipath Delay Commutator (R2MDC) shown in FIG. 6. The basic structural elements comprise commutators 140, butterfly units 142, multipliers 144, and a rotator 146. It shows a simple implementation for any radix-2 based 16-point FFT flowgraph. The utilization of the butterflies and multipliers is only fifty percent. The memory utilization is also not efficient in this implementation.

Figure 7:
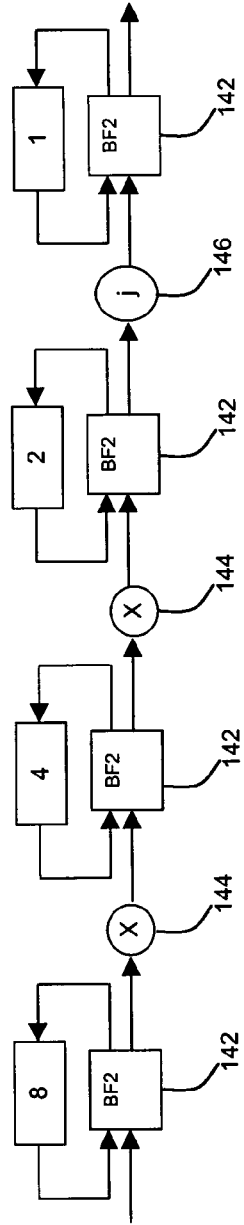
FIG. 7 shows the Radix-2 single path delay feedback pipeline for the FFT implementation.

A Radix-2 Single Path Delay Feedback (R2SDF) is shown in FIG. 7. This pipeline architecture was proposed by, E. H. Wold and A. M. Despain, in Pipeline and Parallel Pipeline FFT Processors for VLSI Implementations, IEEE Transactions on computers, C-35(5):414-426, May 1984. It makes hundred percent utilization of memory. The efficiency of the butterfly and multiplier stages is the same as that of R2MDC.

Figure 8:
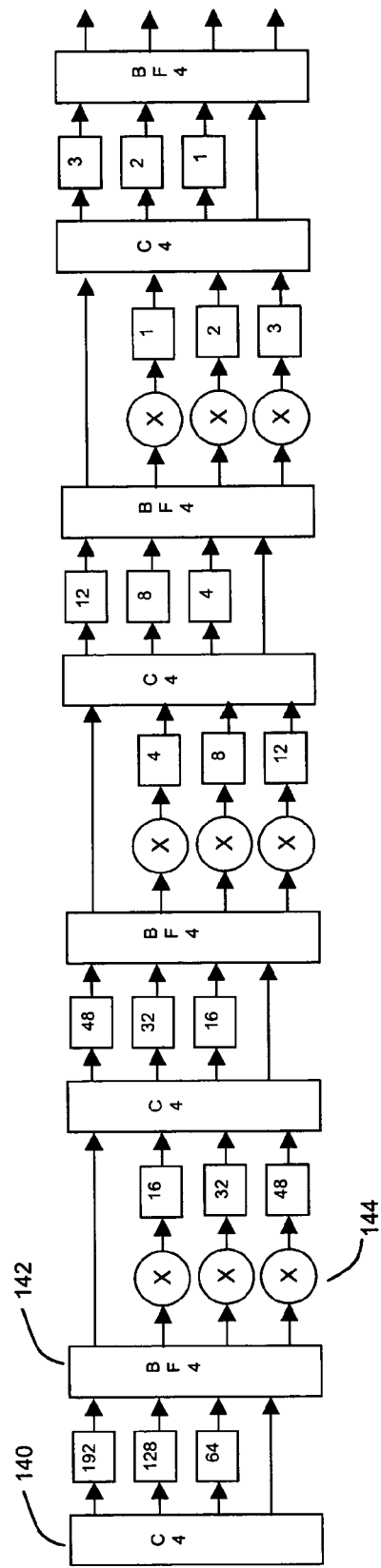
FIG. 8 shows the Radix-4 multipath delay commutator pipeline for the FFT implementation.

FIG. 8 shows a Radix-4 Multi Path Delay Commutator (R2MDC) pipeline architecture for a 256-point FFT. The advantage of using a radix-4 algorithm is that the number of multipliers required is less as compared to a radix-2 algorithm for the same length of FFT. The disadvantage is that radix-4 butterfly units are more complex as compared to radix 2 butterfly units.

Figure 9:
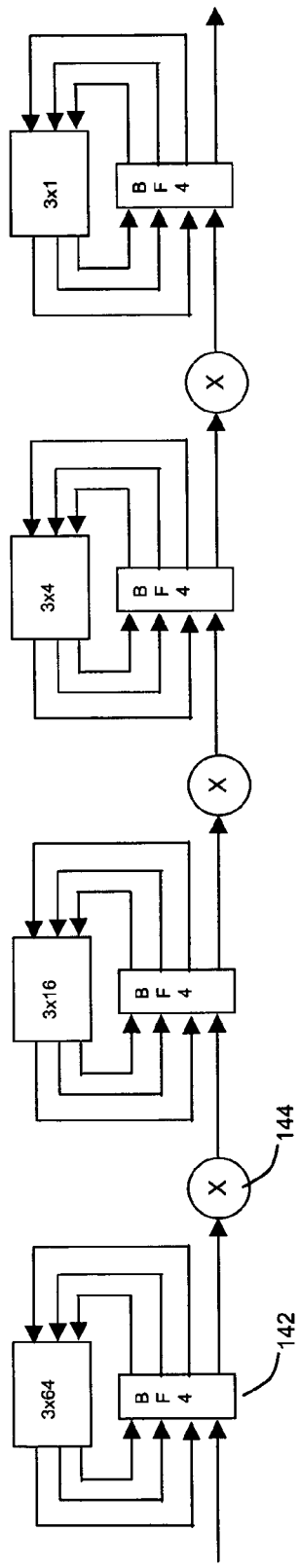
FIG. 9 shows the Radix-4 single path delay feedback pipeline for the FFT implementation.

FIG. 9 shows a Radix-4 Single Path Delay Feedback (R4SDF) pipeline architecture for a 256-point FFT. This is the radix-4 equivalent of R2SDF pipeline. It has the advantage of having a hundred percent memory utilization, which is the characteristic of Single Delay Feedback (SDF) pipeline. It has the advantage of reduced number of multipliers as compared to a radix-2 algorithm based pipeline. It also has the disadvantage of the more complex butterfly structure for radix-4 algorithm based pipeline architecture.

U.S. Pat. No. 6,098,088 proposes a radix-$2^2$ algorithm in Decimation in Frequency (DIF) form, which has a reduced multiplicative complexity of a radix-4 algorithm, and also the simpler butterfly unit of a radix-2 algorithm. In doing so, the best features of both algorithms are combined. But a similar flowgraph has been shown by A. M. Despain in Very Fast Fourier Transform algorithms Hardware for Implementation, IEEE Transactions on Computers, C-28(5):333-341, May 1979. In this architecture, the multiplication is achieved by using CORDIC operations. A similar flow graph for Decimation in Time (DIT) form, has also been derived by R. Storn in Radix-2 FFT Pipeline Architecture with reduced noise to signal ratio, in IEEE Proc.—Vis. Image Signal Process. 141 (2):81-86 April 1994.

Figure 10:
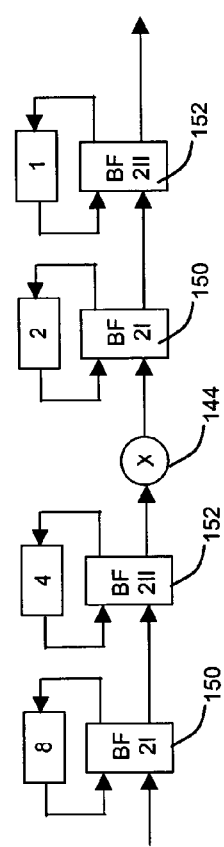
FIG. 10 shows the Radix-$2^2$ single path delay feedback pipeline for the FFT implementation.

U.S. Pat. No. 6,098,088 discloses a derivation of a Radix-$2^2$ algorithm in DIF form. But the DIF form of the flowgraph can be obtained from the DIT form of the flowgraph shown by R. Storn by re-arranging the input (time) coefficients in order and the output (frequency) coefficients in bit-reversed order. This flowgraph has a special property in which for any length of FFT, which is a power of 2, a complex multiplier is required only in alternate stages of the flowgraph. In all the other stages only a simple rotator (multiplication by factor "j") is required. Sousheng He makes use of this property to slightly modify the R2SDF pipeline. If the conventional radix-2 algorithm is used, then a rotator 146 is required only in between the last two butterfly units 142. In between all other butterfly units 142 a complex multiplier 144 is required as shown in FIG. 7. But if a radix-$2^2$ algorithm is used, alternate rotators and multipliers will be required. The rotators can be pulled inside the following butterfly unit which results in a slightly different butterfly unit which has an additional switching logic to exchange the real and imaginary parts (caused as a result of multiplication by "j"). So this results in a new pipeline structure with a pair of butterfly units (one a simple radix-2 butterfly BF 2I 150 and the other a radix-2 butterfly with the switching logic BF 2II 152. Two such pairs of butterfly units connected by a complex multiplier unit 144 form a 16-point FFT circuit. This is shown in FIG. 10 and this invention has been named as Radix $2^2$ SDF (R$2^2$SDF) pipeline.

Figure 11:
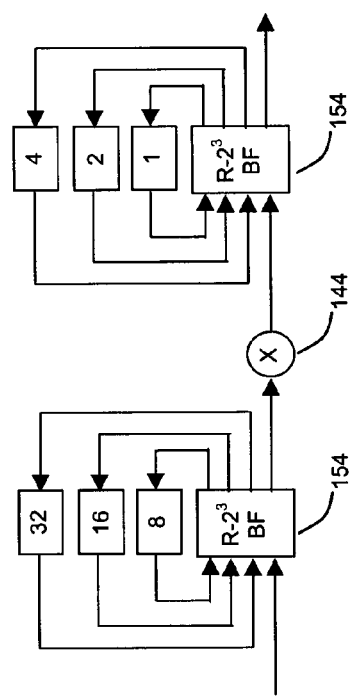
FIG. 11 shows the Radix-$2^3$ single path delay feedback pipeline for the FFT implementation.

U.S. Pat. No. 6,061,705 extends the concept to higher radix to obtain Radix-$2^3$ and Radix-$2^4$ and applies it to the SDF pipeline. The resulting pipeline for a 64-point FFT is shown in FIG. 11. As can be seen it requires only one complex multiplier in the pipeline. The radix-$2^2$ algorithm would require two complex multipliers for a 64-point FFT. The radix-$2^3$ butterfly unit 154 itself consists of three simple radix-2 butterfly units, two simple rotators and one fixed coefficient multiplier. This has been obtained by extending He's idea to decompose the radix-8 butterflies. A main point of this patent is that, the fixed coefficient multipliers consume much less area and power for a higher length FFT as compared to radix-2, radix-4 or even radix-$2^2$ algorithms when applied to the SDF pipeline architecture. Similarly, the radix-$2^4$ butterfly unit has four simple radix-2 butterfly units, three rotators and two, fixed coefficient multipliers. Hellberg also states that extending the concept to higher radix beyond sixteen does not necessarily give power and area advantage.

In order to implement the IFFT, the flowgraph for the FFT needs to be traversed in the reverse direction (i.e., from right to left) and all the twiddle factor coefficients need to be complex conjugated. The pipeline also accordingly gets reversed. So all the pipeline architectures described for the FFT are applicable to the IFFT also.

B. Application of the Invention

Figure 12:
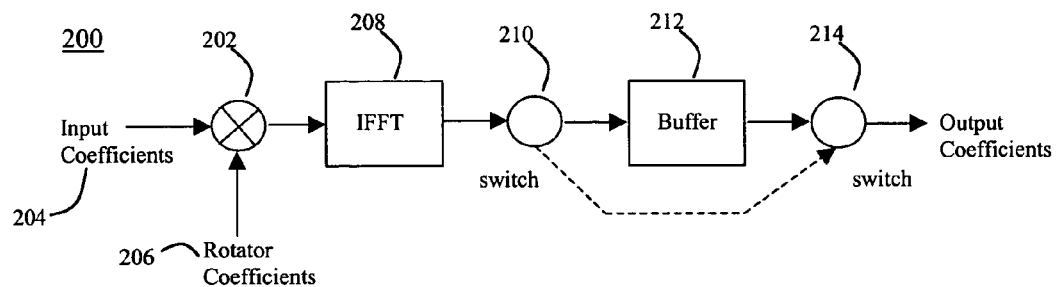
FIG. 12 shows the general scheme for reducing the buffer requirement for GI insertion.

The present invention uses a scheme in which the output of the IFFT is in normal order but circularly shifted by the amount of CP, in order to reduce the buffering requirement for the addition of the CP in the GI. The scheme is applicable to any size (N) of IFFT (and any length (1 to N−1) of cyclic prefix. The invention may be applied to any IFFT algorithm and any pipeline architecture. According to the scheme the output (time) of IFFT is in normal order, but is circularly shifted by the amount of the CP. This reduces the buffering requirement for the addition of CP in the GI. The required buffer size is equal to the length of the CP. An OFDM System 200 using this scheme is illustrated in FIG. 12. A multiplier 202 multiplies the input data 204 by rotator coefficients 206 to get an IFFT output, which is circularly shifted. A Switch 210 selectively switches IFFT 208 output to Buffer 212 and Switch 214.

In one particular case, when the length of IFFT, N, is a power of 2 and a radix 2 or radix $2^2$ algorithm is used, then this invention proposes a scheme by which there is no additional hardware complexity (like multiplier) added to implement the circularly shifted output. With reference to FIG. 12, the IFFT 208 may be modified (without increasing complexity), and Rotator Coefficient 206, and Multiplier 202 may be eliminated in order to obtain a circularly shifted output. An example illustrated here uses the SDF pipeline and the algorithm chosen is Radix-$2^2$ as this results in a very efficient implementation. It is shown that when this scheme is applied to the SDF pipeline using the radix-$2^2$ (or even the conventional radix-2 algorithm), it does not increase the complexity of the pipeline architecture. The invention is not limited to implementation in this pipeline architecture so long as the underlying algorithm is radix 2 or radix $2^2$. For this special case it is required that the input to IFFT is in bit reversed order.

Figure 13:
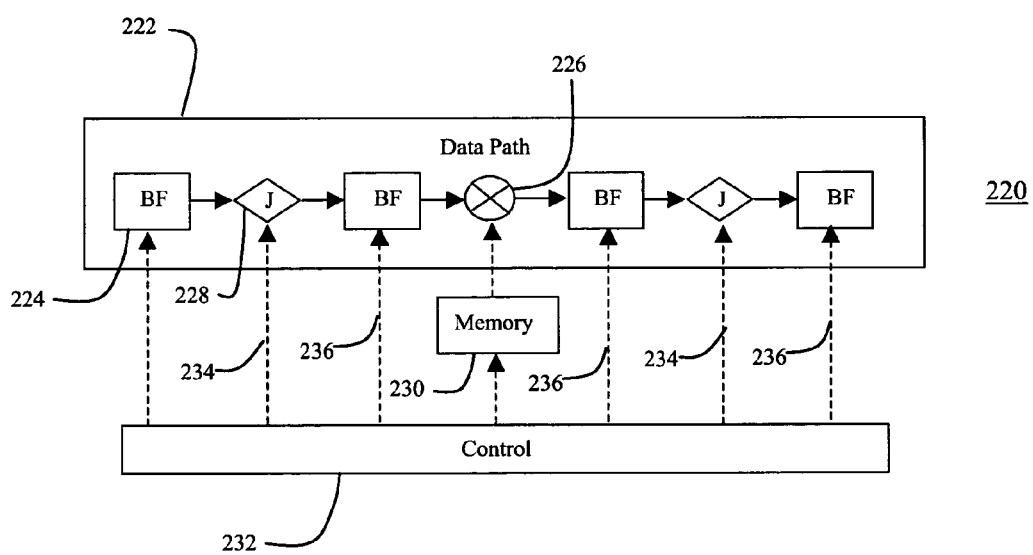
FIG. 13 shows the various components of an FFT/IFFT pipeline circuit.

Two exemplary methods are shown to obtain any circular shift from (1 to N−1) in an N (power of 2) point IFFT. FIG. 13 shows the structure of an IFFT pipeline implementation. The IFFT pipeline 220 includes data path 222, which includes butterfly circuits 224, multiplier circuits 226 and rotator circuits 228. It has a memory 230, which only stores the twiddle factors for the Multiplier circuit. It also has a control circuit 232, which controls the butterfly circuits 224, rotator circuits 228 and multiplier circuits 226. In one method, the twiddle factors contained in the memory 230 connected to the multipliers 226 and the control 234 for the rotators needs to be changed to obtain the appropriate circular shift. This change can be restricted to the first rotator and first multiplier of the pipeline. In another method, the twiddle factor coefficients are not changed, but reordered within the memory 230, and the control 236 of the butterfly and control 234 of rotator circuits of the pipeline is changed. Depending on the amount of circular shift required, the change in the control circuit can range through all the stages of the pipeline. But both methods do not add any extra hardware block like multiplier in the pipeline.

In the present invention, the following circular shifting property of the FFT is made use of to reduce the buffering requirement for GI addition $$x[((n-m))_N] \xleftrightarrow{FFT} W^{km/N} X[k] \quad (1)$$

The double brackets indicates a modulo N operation, which results in a circular shift. Here, x[n] is the time domain sample and X[k] is the corresponding frequency domain data and $$W^{km/N} = e^{-j(2*Pi*k*m)/N} \quad (2)$$

For the case of IEEE 802.11a, selecting N=64 and m=16 gives a circular shift of sixteen samples. So each sample X[k] should be multiplied by $e^{-j(Pi*k)/2}$. Hence, if the input samples of the IFFT, X[k] is multiplied by $e^{-j(Pi*k)/2}$, the output will get circularly shifted by sixteen samples. If the IFFT output is in time order then the sequence of samples will be as follows, x[48], x[49], x[50], . . . x[62], x[63], x[0], x[1], x[2], . . . , x[46], x[47].

Figure 14:
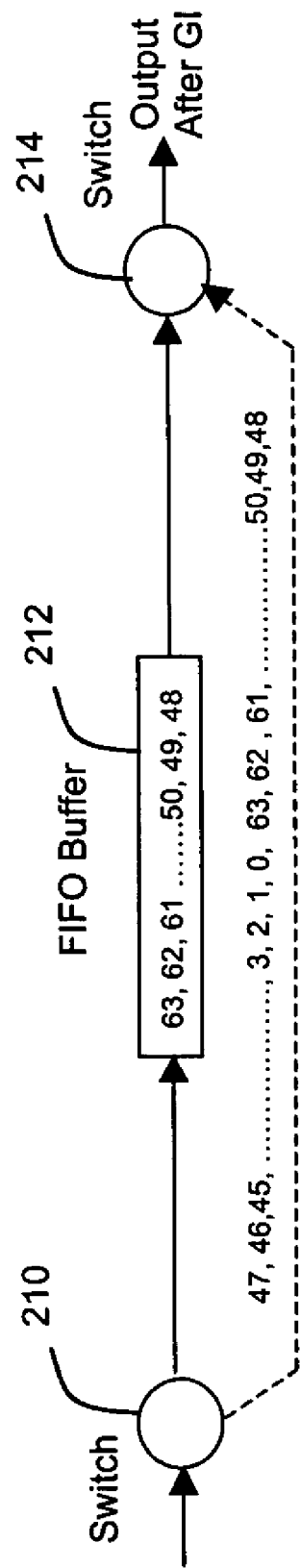
FIG. 14 shows the buffering required for the addition of the Guard Interval, when the output of the 64-point IFFT is in time order but circularly shifted by 16 samples.

In this case only a buffer of sixteen samples is needed as illustrated in FIG. 14. The first sixteen samples (x[48] to x[63]) are fed into the buffer 212 of size sixteen and also routed to the output. After the first sixteen samples, the next forty-eight samples (x[0] to x[47]) are routed directly to the output and not to the buffer. After sixty-four clocks the IFFT output stops for sixteen clocks. During this period the contents of the buffer (x[48] to x[63]) are read out. This whole process is then repeated for each IFFT. It is thus seen that only a buffer of size sixteen is needed. Although this scheme can be applied to any IFFT algorithm in any pipeline architecture, it is preferred to use the R2SDF pipeline with a radix-2 or radix-$2^2$ algorithm. Using this algorithm does not increase the complexity of the pipeline even if each input sample X[k] needs to be multiplied by $e^{-j(Pi*k)/2}$.

Figure 15:
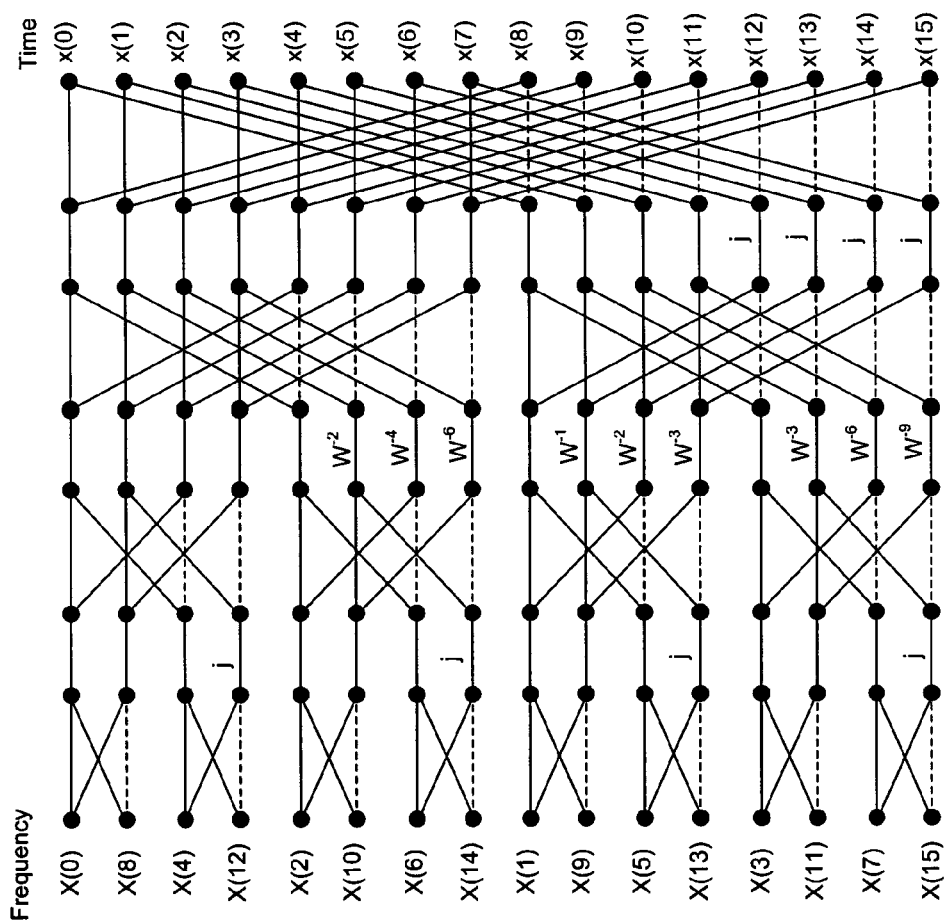
FIG. 15 shows the flow-graph for a Radix-$2^2$ flowgraph for a 16-point IFFT.

The IFFT can be implemented using any FFT flowgraph by traversing it in the reverse direction (from right to left) and conjugating all the twiddle factor coefficients. The radix-$2^2$ flowgraph for a 16-point IFFT is shown in FIG. 15. This particular flowgraph is chosen, as it is the preferred algorithm to be used since it has reduced multiplier complexity of a radix-4 flowgraph while retaining the simplicity of a radix-2 butterfly unit. The invention is also applicable to a radix-2 algorithm. The 16-point IFFT is also chosen for ease of presentation. The idea is applicable to any length of IFFT, which is a power of two.

Figure 16:
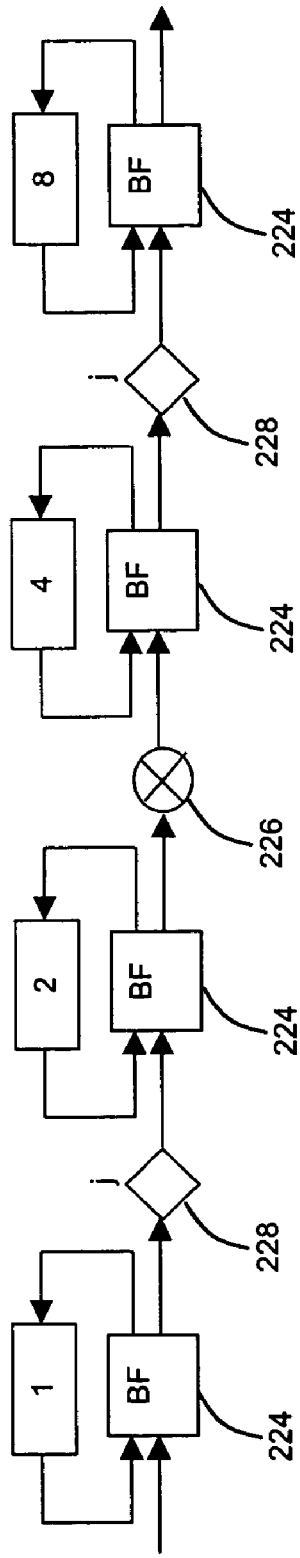
FIG. 16 shows the R2SDF pipeline for the 16-point IFFT.

In the flowgraph the dotted lines indicate a subtraction and the solid lines indicate an addition operation. Also $W^k = e^{-j(2*pi*k)/16}$. It is to be noted that for the IFFT, the input (frequency) is in bit-reversed order and output (time) is in normal order. This is the preferred order, as it requires a single buffer for GI addition. The R2SDF pipeline for the 16-point IFFT is shown in FIG. 16. It is also seen that a multiplier 226 is needed only after the second butterfly 224 stage. After the first 224 and third 224 butterfly stages, the multiplication is only by a factor of "j". This is done by first negating the imaginary part and then exchanging the real and imaginary parts. This does not require a multiplier and is done through phase rotators 228. The R2SDF pipeline requires only one multiplier, two rotators and a total buffer of 15.

Referring to FIG. 15, it can be seen that any set of four consecutive inputs to an N point IFFT would be X(K), X(K+N/2), X(K+N/4) and X(K+3N/4). For the 16-point IFFT, N equals 16 and K takes on values of 0, 2, 1 and 3 for each consecutive set of four samples. To obtain a circular shift of m samples in the output, each input coefficient X(K) has to be multiplied by $e^{-j(2*Pi*k*m)/N}$. The required multiplication constants are shown in the table below.

| Sample | Multiplication Constant | Multiplication Constant ($A_{km} + jB_{km}$) | | | |
| --- | --- | --- | --- | --- | --- |
| | | m = 1 | m = 2 | m = 3 | m = 4 |
| X(K) | $e^{-j(2*Pi*k*m)/N} = A_{km} + jB_{km}$ | $(A_{k1} + jB_{k1})$ | $1 * (A_{k2} + jB_{k2})$ | $1 * (A_{k3} + jB_{k3})$ | $1 * (A_{k4} + jB_{k4})$ |
| X(K + N/2) | $e^{-j[2*Pi*(k+N/2)*m]/N} = e^{-j(2*Pi*k*m)/N} \cdot e^{-j(Pi*m)}$ | $-1 * (A_{k1} + jB_{k1})$ | $1 * (A_{k2} + jB_{k2})$ | $-1 * (A_{k3} + jB_{k3})$ | $1 * (A_{k4} + jB_{k4})$ |
| X(K + N/4) | $e^{-j[2*Pi*(k+N/4)*m]/N} = e^{-j(2*Pi*k*m)/N} \cdot e^{-j(Pi*m)/2}$ | $-j * (A_{k1} + jB_{k1})$ | $-1 * (A_{k2} + jB_{k2})$ | $j * (A_{k3} + jB_{k3})$ | $1 * (A_{k4} + jB_{k4})$ |
| X(K + 3N/4) | $e^{-j[2*Pi*(k+3N/4)*m]/N} = e^{-j(2*Pi*k*m)/N} \cdot e^{-j(3*Pi*m)/2}$ | $J * (A_{k1} + jB_{k1})$ | $-1 * (A_{k2} + jB_{k2})$ | $-J * (A_{k3} + jB_{k3})$ | $1 * (A_{k4} + jB_{k4})$ |

Figure 17:
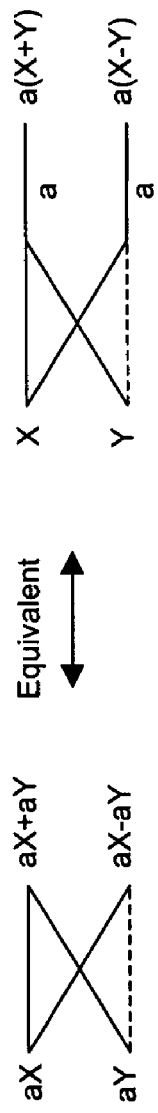
FIG. 17 shows the butterfly equivalence when both inputs to a butterfly are multiplied by the same constant.

It can be seen that for a generic case (any k, m and N that is a power of 2) the constant, $e^{-(2*Pi*k*m)/N}$, will be a complex number equal to $(A_{km}+jB_{km})$. But because of the bit reversed ordering, this complex number forms a constant factor in the set of four multiplication constants for the four consecutive inputs. The additional terms are 1, $e^{-j(Pi*m)}$, $e^{-j(Pi*m)/2}$ and $e^{-j(3*Pi*m)/2}$ for the four consecutive inputs. The last four columns of table gives the values of these additional terms for special case of m=1, 2, 3 and 4. For higher values of m, the values of the additional constants will repeat cyclically. The value of the additional constant for m=1 is same as that for m=5 and the value for m=2 is the same as that for m=6 and so on. But the value of the complex common factor $(A_{km}+jB_{km})$, itself will vary with m. If both the inputs to a butterfly operation are multiplied by the same constant then the constant can be multiplied after the butterfly operation. This butterfly equivalence is shown in FIG. 17. Since this factor is common across four inputs, the constant can be pulled across two butterfly operations. After the second butterfly stage there is a multiplier in the pipeline. So the complex common factor of the constant required for circular shift can be merged with the twiddle factor constants in the multiplier after the second butterfly. For the m=1 and m=3 cases, there is an additional factor "j" associated with the third and fourth constants X(K+N/4) and X(K+3N/4). This factor "j" can be pulled to the rotator present after the first butterfly stage.

This leaves a factor of −1 in some cases. In the butterfly, if the lower input is multiplied by −1, it only means that the output of addition and subtraction are interchanged. In the actual implementation, in the pipeline this requires the output of the subtractor operation to be sent out first followed by the output of the adder operation, which is just the reverse of the normal case. So this also involves just a small modification of the control logic. Thus, it is seen that only the twiddle factor coefficients are modified to get a desired circular shift, but the complexity of the pipeline is not increased.

Figure 18:
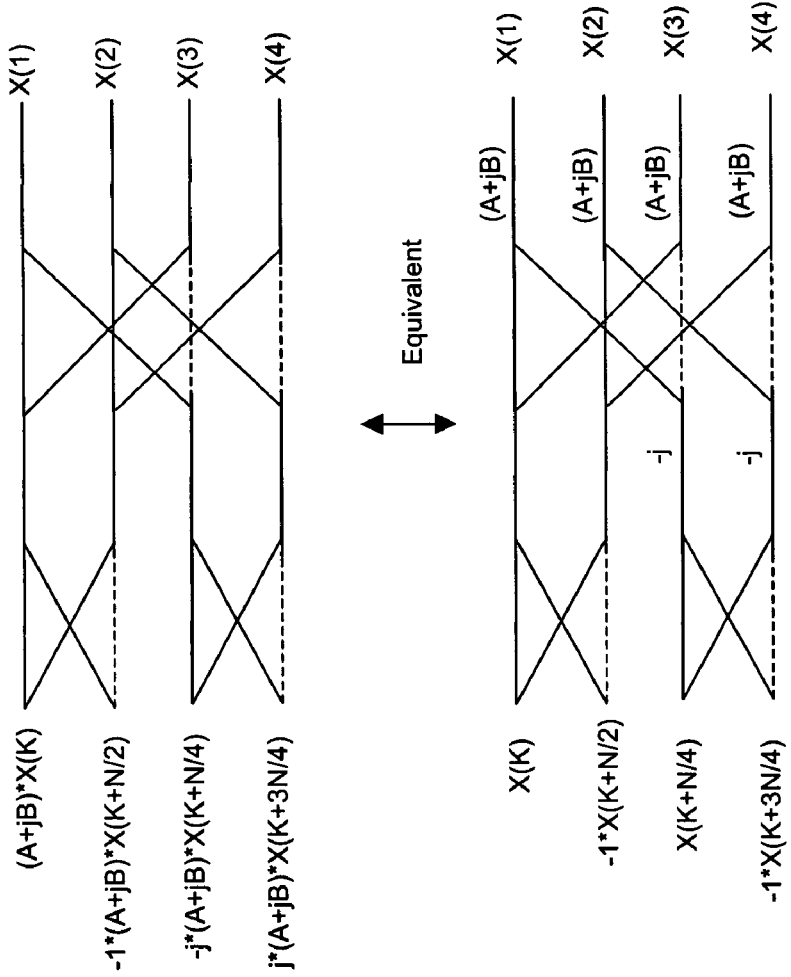
FIG. 18 illustrates the pulling of the complex common factor and the "j" factor to the multiplier and rotator.
Figure 19:
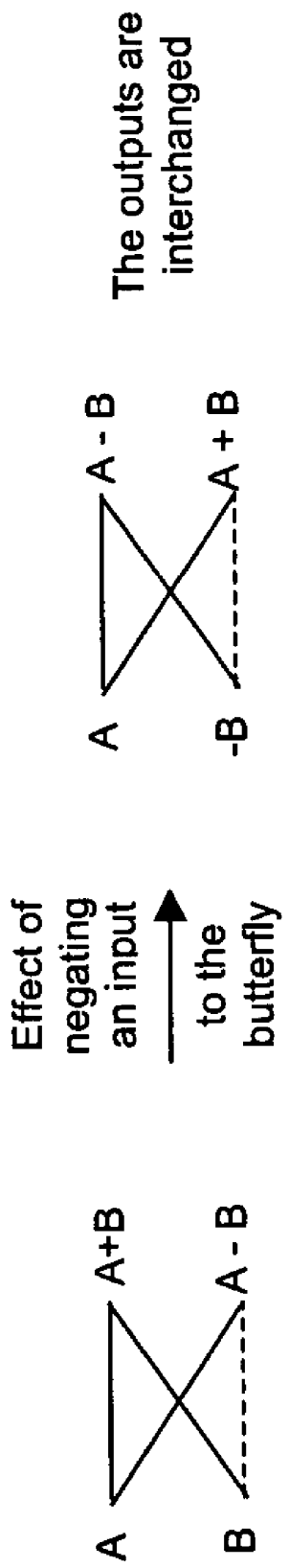
FIG. 19 illustrates the effect of multiplying the lower input of a butterfly by −1.

The pulling of the factor "j", and the complex common factor "$A_{km}+jB_{km}$", for the m=1 case, across the butterfly unit, is illustrated in FIG. 18. It is to be noted that the factor −j is pulled so that a factor of −1 is retained for the lower input of the lower butterfly. The effect of this −1 factor is illustrated in FIG. 19.

Figure 20:
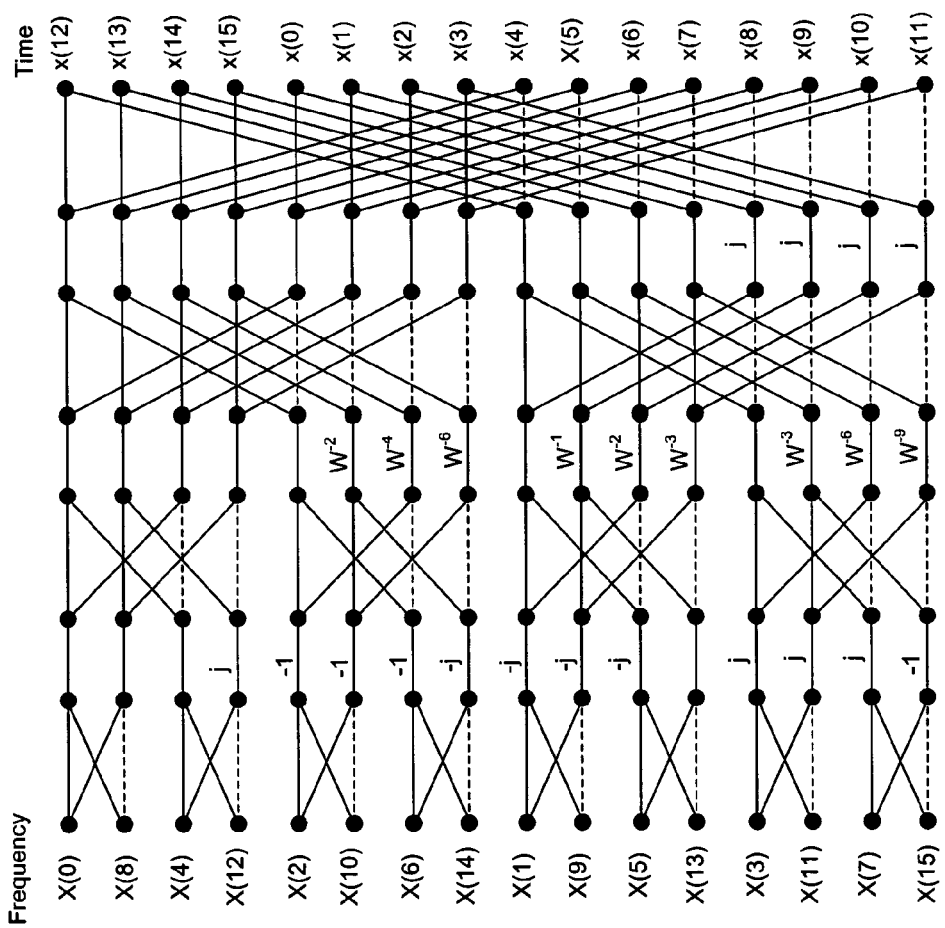
FIG. 20 shows the modified IFFT flowgraph, which results in a circularly shifted output.

For a 16-point IFFT (N=16), if a circular shift of N/4(m=4) is required, then the additional terms, $e^{-j(Pi*m)}$, $e^{-j(Pi*m)/2}$ and $e^{-j(3*Pi*m)/2}$, all take a value of unity. The complex common factor, $A_{km}+jB_{km}$, itself takes values of 1, −1, −j and j for values of k equal to 0, 2, 1 and 3 respectively. So in order to achieve a circular shift of four, in the 16-point IFFT flowgraph of FIG. 15, the first four coefficients should be multiplied by unity, the next four by −1, the next four by −j and the final four by j. Since there are no complex constants, the factors of −1, j and −j need to be pulled only till the rotator after the first butterfly. The modified flowgraph with a circular shift of four is shown in FIG. 20.

Figure 21:
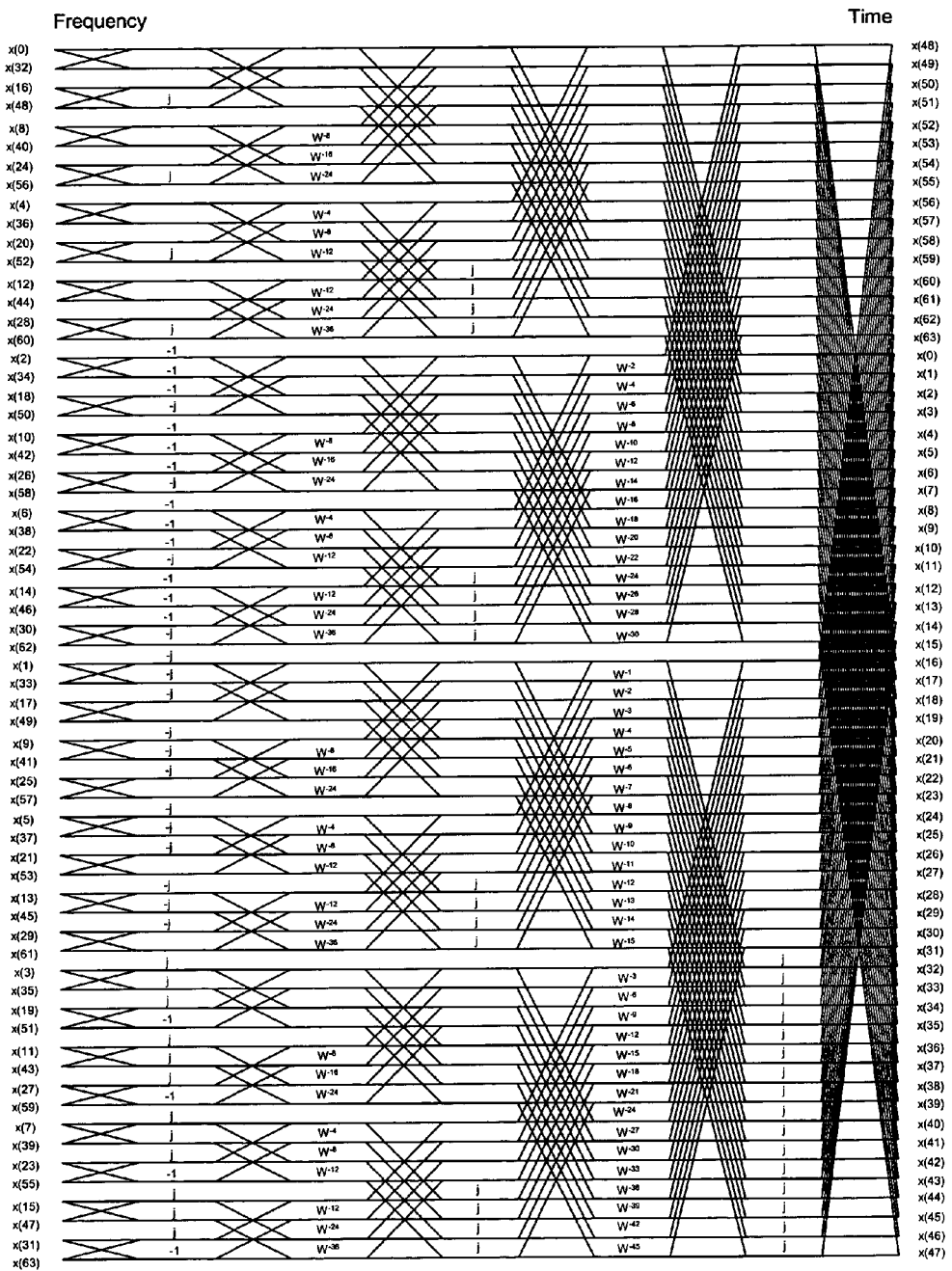
FIG. 21 shows the modified 64-point IFFT flowgraph with 16-points circularly shifted output.

For the special case of IEEE 802.11a, the size of IFFT is sixty-four (N=64) and the circular shift required is sixteen (m=N/4=16). So it reduces to the case just considered for the 16-point IFFT with a circular shift of four. For the IEEE 802.11a case, the first sixteen samples are multiplied by unity, the next sixteen by −1, the next sixteen by −j and the last sixteen by j. These factors can be pulled in to merge with the first rotator coefficients. The modified flowgraph for a 64-point IFFT, with a circular shift of 16 is shown in FIG. 21.

An alternative implementation is now described, to obtain any circular shift (1 to N−1) in an N point IFFT. This method is also applicable for a radix-$2^2$ (or radix-2) algorithm. The implementation is described here, using a SDF pipeline, with respect to the 16-point IFFT, using the radix-$2^2$ algorithm as shown in FIG. 15.

In the normal implementation, for the SDF pipeline, in the butterfly unit, always the result of the addition operation is sent out first and the result of the subtraction operation is sent later. In the butterfly unit an addition and a subtraction operations are done in a single cycle. The result of the additions is sent out first and always the result of the subtraction are stored in the delay feedback and sent out later depending on the length of feedback buffer. In FIG. 16 the first butterfly unit (224) sends out the result of addition and subtraction in alternate cycles as it has a single buffer in the delay feedback. The second butterfly unit (224) sends out two addition results followed by two subtraction results as it has a buffer of size two in the delay feedback. The third butterfly unit (224) sends out four addition results followed by four subtraction results and so on.

In the proposed alternative method, this control is modified to obtain the required circular shift without modifying the twiddle factors. Depending on the amount of circular shift required, in some stages, the result of the subtraction is sent out first and the result of the addition is stored in the delay buffer and sent out later. The following table indicates the required modification to obtain any circular shift (from 1 to N−1) for the radix-$2^2$ 16-point IFFT algorithm in a SDF pipeline shown in FIG. 16.

| Circular Shift | Stage 1 | Stage 2 | Stage 3 | Stage 4 |
| --- | --- | --- | --- | --- |
| 0 or 16 | (+) × 8 | (++) × 4 | (++++) × 2 | (++++++++) × 1 |
| 1 | (−) × 8 | (−+) × 4 | (−+++) × 2 | (−+++++++) × 1 |
| 2 | (+) × 8 | (−−) × 4 | (−−++) × 2 | (−−++++++) × 1 |
| 3 | (−) × 8 | (+−) × 4 | (−−−+) × 2 | (−−−+++++) × 1 |
| 4 | (+) × 8 | (++) × 4 | (−−−−) × 2 | (−−−−++++) × 1 |
| 5 | (−) × 8 | (−+) × 4 | (+−−−) × 2 | (−−−−−+++) × 1 |
| 6 | (+) × 8 | (−−) × 4 | (++−−) × 2 | (−−−−−−++) × 1 |
| 7 | (−) × 8 | (+−) × 4 | (+++−) × 2 | (−−−−−−−+) × 1 |
| 8 | (+) × 8 | (++) × 4 | (++++) × 2 | (−−−−−−−−) × 1 |
| 9 | (−) × 8 | (−+) × 4 | (−+++) × 2 | (+−−−−−−−) × 1 |
| 10 | (+) × 8 | (−−) × 4 | (−−++) × 2 | (++−−−−−−) × 1 |
| 11 | (−) × 8 | (+−) × 4 | (−−−+) × 2 | (+++−−−−−) × 1 |
| 12 | (+) × 8 | (++) × 4 | (−−−−) × 2 | (++++−−−−) × 1 |
| 13 | (−) × 8 | (−+) × 4 | (+−−−) × 2 | (+++++−−−) × 1 |
| 14 | (+) × 8 | (−−) × 4 | (++−−) × 2 | (++++++−−) × 1 |
| 15 | (−) × 8 | (+−) × 4 | (+++−) × 2 | (+++++++−) × 1 |

In the table, the first column indicates the amount of circular shift. The remaining columns show the control required for each of the butterfly stages. For a 16-point IFFT, the butterfly unit in every stage performs eight operations (i.e. eight additions and eight subtractions). A "+" indicates that the result of the addition is sent out to the next stage and result of the subtraction is sent to the feedback buffer. This is like the normal operation. But a "−" indicates the exact reverse where the result of the subtraction is sent out first and the result of the addition is sent to the feedback buffer. The "×8" for stage 1 indicates that the pattern in the brackets is repeated 8 times. This is used just to highlight the regular pattern in the control of the butterfly units.

The first row indicates the control for a circular shift of zero or sixteen, which is the regular case of no circular shift. In this case all the butterfly units always send out the result of the addition first. Hence, the control for all the stages has only the "+" sign.

Consider the second row, which shows the controls, required to obtain a circular shift of one. For the first stage, in all the eight butterfly operations the result of the subtraction should be sent out first. For the second stage, in the first operation the result of the subtraction should be sent first and for the second operation the result of the addition should be sent first. This pattern should be repeated four times to complete the eight operations. For the third stage, in the first operation the result of the subtraction is sent out first and in the next three operations the result of the addition is sent out. This pattern is repeated twice to complete the eight operations. For the last stage, only in the first operation the result of the subtraction is sent out first. In the remaining seven operations the result of the addition is sent out first.

It can be seen that there is a very regular pattern in the control required for getting the different amount of circular shifts. The control required for any higher length N which is a power of 2, can easily be obtained by extending the table to follow the regular pattern. For the special case of IEEE 802.11a, N=64 and the circular shift required is 16. For this special case the following table gives the required control for all the stages of a radix 2/radix $2^2$ pipeline.

| Stage | Control |
| --- | --- |
| Stage 1 | (+) × 32 |
| Stage 2 | (++) × 16 |
| Stage 3 | (++++) × 8 |
| Stage 4 | (++++ ++++) × 4 |
| Stage 5 | (---- ---- ---- ----) × 2 |
| Stage 6 | (---- ---- ---- ---- ++++ ++++ ++++ ++++) × 1 |

This invention describes a scheme for implementing an IFFT in the transmitter of OFDM based systems. The output of the IFFT is circularly shifted to minimize buffer requirement for GI addition. If the same pipeline is reversed and the twiddle factors are conjugated then it would implement an FFT for the receiver. This is done to reuse the hardware blocks of the transmitter in the receiver. Since the original pipeline for IFFT was designed for a circularly shifted output, the reversed pipeline for FFT would give the frequency domain coefficients rotated by $W^{km/N}$ as indicated by equation 1. This does not cause a problem in OFDM based receivers as this factor would be eliminated after channel equalization.

This invention describes a scheme for circularly shifting the output of IFFT, with reference to GI insertion in OFDM based transmission systems. But the invention described here is not limited to OFDM systems alone, but can be used to obtain circular shift in FFT/IFFT used in any system.

What is claimed is:

1. A circuit for converting frequency domain information to time domain information comprising:
   a. an Inverse Fast Fourier Transform circuit having a length of N samples, the Inverse Fast Fourier Transform circuit adapted to receive input data of length N samples, to circularly shift the input data by m samples; and to generate output data of length N samples not multiplied by external rotator coefficients that are circularly shifted by m samples, where m is less than N; and
   b. a Cyclical Prefix Insertion circuit adapted to insert a cyclical prefix of length m, the Cyclical Prefix Insertion circuit having;
      1. a first switch, connected to the Inverse Fast Fourier Transform circuit;
      2. a buffer, having an input connected to the first switch and an output, the buffer having a length m; and
      3. a second switch, coupled to the first switch and to the buffer, wherein the first and second switches selectively couple the output of the buffer and the Inverse Fast Fourier Transform circuit to an output of the second switch;
   wherein the N samples is a power of 2 and wherein the Inverse Fast Fourier Transform circuit implements an algorithm selected from the group consisting of Radix-2 and Radix-$2^2$ algorithms; and
   wherein the Inverse Fast Fourier Transform circuit further comprises a plurality of butterfly circuits, rotator circuits and multiplier circuits with memories, all coupled to a control circuit, and the Inverse Fast Fourier Transform is adapted to circularly shift the input data by m samples by modifying memory contents for at least one multiplier circuit with memory and modifying the control for at least one rotator circuit.

2. A circuit for converting frequency domain information to time domain information of claim 1 wherein the Inverse Fast Fourier Transform circuit
   a. wherein each butterfly circuit is configured to perform an addition operation and a subtraction operation;
   b. wherein the control circuit is configured to modify the control to the rotator circuit and to selectively control the plurality of butterfly circuits whether the addition operation or the subtraction operation is output first in time to effect a circular shift of the output of the Inverse Fast Fourier Transform circuit by m samples; and
   c. wherein the contents of the memory of the multiplier circuit with memory are arranged in a suitably modified manner.

3. The circuit for converting frequency domain information to time domain information of claim 1 wherein the length of N samples is segmented into first, second, third, and fourth segments of N/4 samples, wherein the circular shift m is equal to N/4 and is effected by multiplying the input N samples by unity for the first segment of N/4 samples, −1 for the second segment of N/4 samples, −j for the third segment of N/4 samples, and j for the fourth segment of N/4 samples.

4. The circuit for converting frequency domain information to time domain information of claim 3 wherein the first, second, third, and fourth segments of N/4 samples comprise the length of N samples in consecutive order.

5. The circuit for converting frequency domain information to time domain information of claim 3 wherein the N samples of the Inverse Fast Fourier Transform is equal to 64 and the cyclical prefix has a length m equal to 16.

6. The circuit for converting frequency domain information to time domain information of claim 1 wherein the length of N samples of the Inverse Fast Fourier Transform and the cyclical prefix has a length m equal to N/4, and a control for a first rotator circuit is modified to effect the shift of the samples at the output of the Inverse Fast Fourier Transform by m samples.

7. The circuit for converting frequency domain information to time domain information of claim 6 wherein the N samples of the Inverse Fast Fourier Transform is equal to 64 and the cyclical prefix has a length m equal to 16.

8. The circuit for converting frequency domain information to time domain information of claim 1 wherein the cyclical prefix comprises a guard interval for an orthogonal frequency division multiplexing system.

9. A circuit for converting frequency domain information to time domain information comprising;
   a. an Inverse Fast Fourier Transform circuit having:
      1. an input adapted to receive frequency domain information;
      2. an output providing time domain information;
      3. the Inverse Fast Fourier Transform circuit having a length of N samples, where N is a power of 2 and the N samples are not multiplied by external rotator coefficients, and implementing an algorithm selected from the group consisting of Radix-2 and Radix-$2^2$ algorithms, the Inverse Fast Fourier Transform circuit further having a plurality of butterfly circuits, multiplier circuits with memory and rotator circuits, all coupled to a control circuit and configured to circularly shift output information by m samples, where m is less than N; and
   b. guard interval insertion circuit adapted to insert a cyclical prefix of length m, the guard interval insertion circuit having;
      1. a first switch, connected to the output of the Inverse Fast Fourier Transform circuit;
      2. a buffer, having an input connected to the first switch and an output, the buffer having a length m; and
      3. a second switch, coupled to the first switch and to the buffer, wherein the first and second switches selectively couple the output of the buffer and the output of the Inverse Fast Fourier Transform circuit to an output of the second switch.

10. The circuit for converting frequency domain information to time domain information of claim 9 wherein the Inverse Fast Fourier Transform circuit is configured to circularly shift output information by m samples by modifying the control for the first rotator circuit and memory contents of the first multiplier circuit with memory.

11. The circuit for converting frequency domain information to time domain information of claim 9 wherein the Inverse Fast Fourier Transform circuit is configured to circularly shift output information by m samples by modifying the order of the contents of the memory and modifying the control circuit to modify the control of the rotator circuits and butterfly circuits.

12. The circuit for converting frequency domain information to time domain information of claim 9 wherein the length of N samples of the Inverse Fast Fourier Transform is equal to 64 and the cyclical prefix has a length m equal to 16, and the modification is applied to control for the first rotator circuit of the Inverse Fast Fourier Transform circuit to circularly shift the output data by 16 samples.

13. A circuit for converting frequency domain information to time domain information comprising:
   a. a means for performing a circularly shifted Inverse Fast Fourier Transform on frequency domain information to generate time domain information comprising a plurality of butterfly circuits, rotator circuits and multiplier circuits with memories, all coupled to a control circuit and a means for modifying the order of the contents of the memory for at least one multiplier circuit with memory and modifying the control circuit to modify the control for at least one rotator circuit and butterfly circuit, wherein the circular shift is approximately the same as a desired cyclical prefix and input samples for the Inverse Fast Fourier Transform are not multiplied by external rotator coefficients;
   b. a first switch, connected to the means for performing a circularly rotated Inverse Fast Fourier Transform;
   c. a means for buffering a portion of the time domain signals approximately the same as the desired cyclical prefix, the means for buffering having an input connected to the first switch; and
   d. a second switch, coupled to the first switch and to the means for buffering, wherein the first and second switches selectively couple the output of the means for buffering and the means for performing a circularly rotated Inverse Fast Fourier Transform circuit to an output of the second switch.

14. The circuit for converting frequency domain information to time domain information of claim 13 wherein the cyclical prefix comprises a guard interval for an orthogonal frequency division multiplexing system.

15. A method of generating circularly shifted time domain signal from frequency domain information in an Inverse Fast Fourier Transform circuit and having a desired cyclical prefix comprising:
   a. performing a circularly rotated Inverse Fast Fourier Transform on frequency domain information to generate time domain information without multiplying input samples by external rotator coefficients, wherein the amount of the circular shift is the same as the length of the cyclical prefix, and wherein the Inverse Fast Fourier Transform comprises a plurality of butterfly circuits, rotator circuits and multiplier circuits with memories, all coupled to a control circuit and the step of performing a circularly shifted Inverse Fast Fourier Transform further comprises modifying the control circuit to modify the control for at least one rotator circuit and butterfly circuit and memory contents of at least one multiplier circuit with memory;
   b. storing the time domain information for a number of clock cycles equal to the cyclical prefix in a buffer while simultaneously outputting the time domain information;
   c. outputting the time domain information for a number of clock cycles equal to a length of the Inverse Fast Fourier Transform minus the length of the cyclical prefix; and
   d. outputting the time domain information stored in the buffer for a number of clock cycles equal to the length of the cyclical prefix.

* * * * *